Patented May 17, 1949

2,470,160

UNITED STATES PATENT OFFICE 2,470,160

PHENYLSEMIOXAMAZIDE INSECTICIDAL COMPOSITIONS

Samuel I. Gertler, Washington, D. C., assignor to the United States of America as represented by the Secretary of Agriculture No Drawing. Application July 19, 1946, Serial No. 684,916

13 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to improvements in materials for destroying or checking the growth or multiplication of living organisms whether plant or animal which are economically injurious to man.

An object of the invention is to provide insecticidal compositions for dusting or spraying delicate vegetation such as bean plants, peach trees, and plants grown under glass, without injury to foliage.

A further object of the invention is to provide insecticidal compositions which are relatively nontoxic to man and domestic animals when taken by mouth, and which can be used in place of lead arsenate and other arsenicals for destroying insects without leaving harmful residues on fruits and vegetables.

Other objects will be apparent from the following description of the invention.

I have found that phenylsemioxamazides, which may be designated by the following general formula

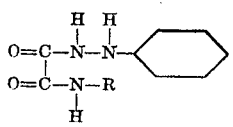

in which R is selected from the group consisting of hydrogen and an aliphatic radical of not more than two carbon atoms, when incorporated in a carrier to form a dust or spray composition, and as such applied to material liable to attack by insects, has a specific toxic effect upon such insects. The carrier forming the dust composition with one of these compounds comprises a suitable material such as pyrophyllite or kaolin, with a sticking agent like glue, casein, rosin and so forth. The carrier forming a spray composition comprises a mixture of a suitable material such as pyrophyllite or kaolin, a wetting agent such as saponin, sodium lauryl sulfate, soap, and so forth, and water, the function of the wetting agent being to form a suspension of the composition in water, when so used.

In the following examples, which are illustrative of the invention, a dust composition will be understood to mean a given concentration of the compound in question with the other ingredients as mentioned above. A spray composition will denote a certain number of pounds of compound plus a wetting agent in 100 gallons of water or pounds of composition plus other dust plus wetting agent in 100 gallons of water.

EXAMPLE 1

1-phenylsemioxamazide

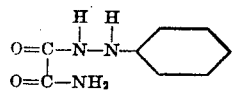

A spray composition, containing 2 pounds of 1-phenylsemioxamazide in 100 gallons of water, when sprayed on cauliflower leaves which were exposed to newly hatched larvae of the European corn borer gave 100 percent kill in 48 hours.. A similar composition containing 1 pound per 100 gallons gave 96.9 percent kill in the same time.

A dust composition containing approximately equal parts of this compound and pyrophyllite, when dusted on pumpkin leaves and fed to the fourth instar of the melonworm, gave a mortality of 100 percent in 3 days. The same mixture made up into a spray composition at a concentration of 8 pounds to 100 gallons of water and sprayed on pumpkin leaves fed to the same insect also gave 100 percent mortality in 3 days.

The above dust composition dusted on pigweed leaves and fed to the fourth instar of the Southern armyworm gave 100 percent kill in 3 days. When used as a spray composition as above, 87 percent kill was obtained in 3 days.

The same dust composition dusted on pigweed leaves exposed to the fourth instar of the Southern beet webworm gave 100 percent kill in 3 days. The spray composition also gave the same result.

A smear composition prepared by mixing the compound with lampblack and suspended in a suitable liquid such as benzol, applied to the wounds of domestic animals infested with newly hatched larvae of the screwworm, gave complete control at a concentration as low as 0.1 percent of the compound.

EXAMPLE 2

5-methyl-1-phenylsemioxamazide

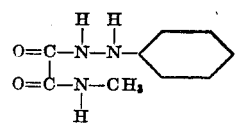

A spray composition containing 4 pounds of 5-methyl-1-phenylsemioxamazide in 100 gallons of water when sprayed on cauliflower leaves and fed to newly hatched larvae of the European corn borer, gave 100 percent kill in 48 hours. At a concentration of 1 pound in 100 gallons of water 96.0 percent kill was obtained in the same time.

A dust composition containing approximately equal parts of this compound and pyrophyllite, when dusted on pumpkin leaves and fed to the fourth instar melonworm, gave 100 percent mortality in three days. A spray composition containing 8 pounds of the mixture in 100 gallons of water also gave 100 percent mortality in the same time.

The same dust composition, dusted on pigweed leaves which were fed to the fourth instar of the Southern beet webworm gave a mortality of 100 percent in three days. The above spray composition, when sprayed on Swiss chard leaves fed to the same insect also gave 100 percent kill in three days.

The same dust composition, dusted on pigweed leaves and fed to the fourth instar Southern armyworm gave a mortality of 94 percent in 3 days.

A smear composition prepared as described in Example 1 and applied to newly hatched larvae of the screwworm gave complete control at a concentration as low as 0.05 percent.

EXAMPLE 3

5-ethyl-1-phenylsemioxamazide

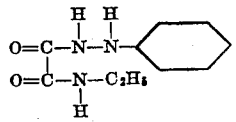

A dust composition prepared as above using 5-ethyl-1-phenylsemioxamazide when dusted on pumpkin leaves and fed fourth instar melonworm gave 100 percent kill in three days. A spray composition containing 8 pounds of the mixture to 100 gallons of water also gave 100 percent kill in the same period of time.

The same dust composition applied to pigweed leaves and fed to the fourth instar of the Southern beet webworm gave a mortality of 100 percent in 3 days.

A smear composition prepared as described in Example 1 and applied to newly hatched larvae of the screwworm gave complete control at a concentration as low as 0.17 percent.

*Foliage tests.*—A spray composition of each of the above examples prepared with 8 pounds of compound and ⅛ pound of saponin per 100 gallons of water, was sprayed on pumpkin, tomato, collard, pea, bean, and radish plants to determine whether any injury to the foliage could be noted. Practically no injury to any of these plants was caused by the above compositions.

It is to be understood that compositions containing the above mentioned compounds are merely used as examples and that this invention is not restricted to such use. Also the above examples are not to be construed as limiting either the method of application of these novel insecticides or the kinds of insects to which they may be applied. Compositions containing other members of this series of compounds have been found to show varying degrees of toxicity to different insects. For the control of certain types of insects it may be advantageous to admix any compound or composition of this class with known insecticides such as lead arsenate, derris, nicotine, pyrethrum, DDT, and so forth.

Having thus described my invention, I claim:

1. An insecticidal composition comprising a compound of the general formula

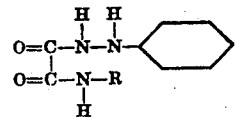

in which R is selected from the group consisting of hydrogen and an aliphatic radical of not more than two carbon atoms, and pyrophyllite.

2. An insecticidal composition comprising pyrophyllite, a sticking agent and a compound of the general formula

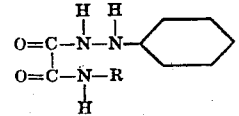

in which R is selected from the group consisting of hydrogen and an aliphatic radical of not more than two carbon atoms.

3. An insecticidal composition comprising water, pyrophyllite, a wetting agent, and a compound of the general formula

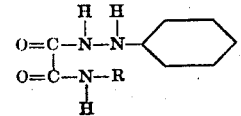

in which R is selected from the group consisting of hydrogen and an aliphatic radical of not more than two carbon atoms.

4. An insecticidal composition comprising pyrophyllite, a sticking agent and 1-phenylsemioxamazide.

5. An insecticidal composition comprising water, pyrophyllite, a wetting agent and 1-phenylsemioxamazide.

6. An insecticidal composition comprising water, pyrophyllite, a wetting agent and 5-methyl-1-phenylsemioxamazide.

7. An insecticidal composition comprising water, pyrophyllite, a wetting agent and 5-ethyl-1-phenylsemioxamazide.

8. An insecticidal composition comprising a dust carrier, sticking agent, and an insecticidally active ingredient of the formula

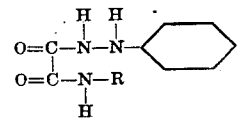

in which R is selected from the group consisting of hydrogen and an aliphatic radical of not more than two carbon atoms, the carrier being present in an amount at least equal in weight to the said active ingredient.

9. An insecticidal composition comprising a dust, water, and a compound of the formula

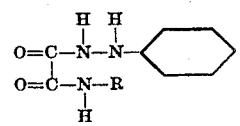

in which R is selected from the group consisting of hydrogen and an aliphatic radical of not more than two carbon atoms.

10. The composition defined in claim 9 in which the compound of the said formula is present in an amount no more than about equal in weight to the dust.

11. An insecticidal composition comprising: a compound of the formula:

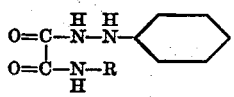

in which R is selected from the group consisting of hydrogen and an aliphatic radical of not more than two carbon atoms; and a carrier comprising water containing a wetting agent to form a suspension of the composition in water, the water being present in the ratio of 100 gallons of water to no more than about 4 pounds of the compound of said formula.

12. An insecticidal composition comprising: a compound of the formula:

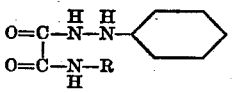

in which R is selected from the group consisting of hydrogen and an aliphatic radical of not more than two carbon atoms; a dust carrier; and a wetting agent.

13. An insecticidal composition comprising lampblack, benzol, and an insecticidal ingredient of the formula:

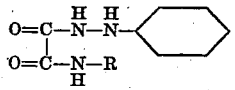

in which R is taken from the group consisting of hydrogen and an aliphatic radical of not more than two carbon atoms.

SAMUEL I. GERTLER.

REFERENCES CITED

The following references are of record in the file of this patent:

UNITED STATES PATENTS

| Number | Name | Date |
|---|---|---|
| 2,272,047 | Freeman | Feb. 3, 1942 |

OTHER REFERENCES

Bulow, Berichte, volume 35, page 3687. Abstracted in Beilstein, Band XV, page 265. (Copy of Berichte in Library.)